July 6, 1943.   S. B. FREIBERG   2,323,462
BOOKKEEPING OR ACCOUNTING AID
Filed Dec. 31, 1940
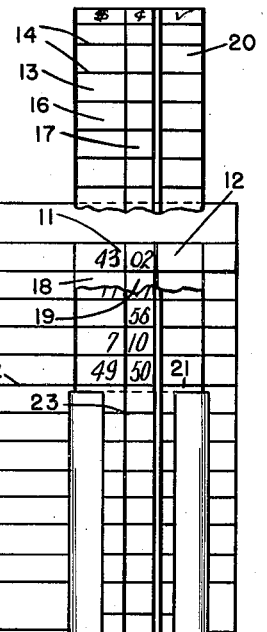
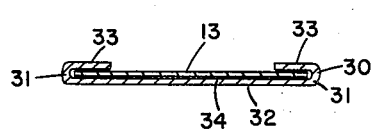
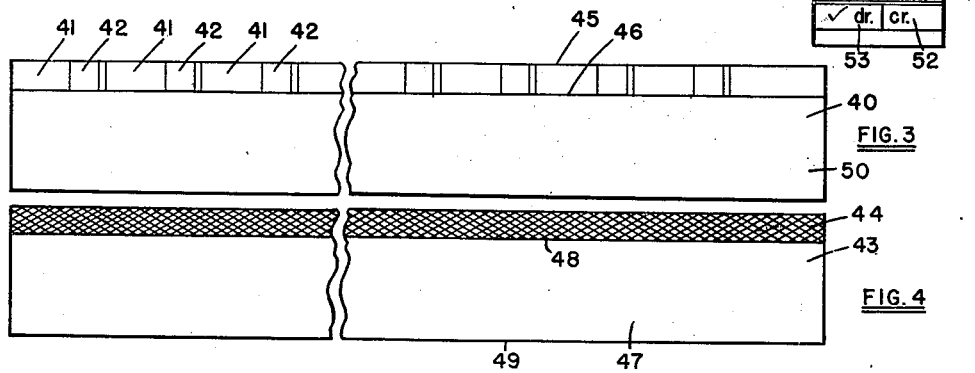
INVENTOR
STANLEY B. FREIBERG
BY
ATTORNEYS Patented July 6, 1943

2,323,462

UNITED STATES PATENT OFFICE 2,323,462

BOOKKEEPING OR ACCOUNTING AID

Stanley B. Freiberg, Cincinnati, Ohio

Application December 31, 1940, Serial No. 372,597

5 Claims. (Cl. 282—29)

This invention relates to a bookkeeping or accounting aid.

An object of the present invention is to provide a bookkeeping or accounting aid in the form of a tally sheet upon which items from posting media may be entered incident to the posting operation.

Another object of the invention is to provide a tally sheet, having the hereinabove described characteristics, upon which the items posted may be accumulated in their sequence of posting, for the purpose of proving and totaling the amounts of the items posted.

Still another object of the invention is to provide a tally sheet the top surface of which is provided with a plurality of vertical and horizontal columns, and the rear or bottom surface of which is provided with suitable transfer material for permitting entries made on such tally sheets to be transferred onto the particular record sheet being posted.

A further object of the invention is to provide novel shielding means for use with a tally sheet having the hereinabove described characteristics, for facilitating the handling of such tally sheets, and for precluding accidental or unintentional smearing of the transfer material from the bottom surface of the tally sheet onto the record sheet incident to posting.

Still a further object of the invention is to provide a novel method of using tally sheets having the hereinabove described characteristics for simplifying and expediting the proving and posting of accounts.

These and other objects are attained by the means described herein and disclosed in the accompanying drawing, in which:

Fig. 1 is a plan view of a record sheet with a tally sheet of the present invention operatively associated therewith.

Fig. 2 is a sectional view taken on line 2—2 of Fig. 1.

Fig. 3 is a plan view of the front, upper or printed surface of a modified form of tally sheet, embodying the present invention.

Fig. 4 is a plan view of the rear or back surface of the tally sheet of Fig. 3.

Heretofore it has been the common practice when posting accounts by hand, for the accounting department to receive from the billing or auditing department a list of the amounts to be posted including the total of such amounts. This total will hereinafter be referred to as the predetermined total, and refers to the total of the amounts to be posted as taken from bills, invoices, checks, and the like, hereinafter broadly referred to as posting media. The amounts from the posting media were then posted, one by one, directly onto suitable record or account sheets until the entire batch of posting had been entered. After each account had thus been posted the account sheet was set aside, or otherwise suitably identified so as to enable an operator to quickly distinguish the recently posted account sheets from the other account sheets of his records. After each batch of accounts had been posted it was customary for the amounts posted to be totalled, and if the total thus obtained agreed with the predetermined total, the posting had been properly done, and the account sheets were returned to their file or the identifying indicia removed therefrom.

In those instances where the posting was a continuous process, the items posted for a given period or time, such as, by way of example, a day were totalled as were the amounts of the bills, checks, invoices, etc. If the two totals were in agreement, the posting was done correctly.

In those instances where machine posting was used, the individual account cards were removed from their file, posted and then offset in a tub file. The amounts thus posted were totalled, and the total thus obtained was compared with the predetermined total. If the totals were in agreement the posting had been properly done and the offset cards were returned to their normal position within the file.

With the foregoing in mind, it is apparent that in the event that the total of the posted items did not agree with the predetermined total of the posting media from which the posting was made, it became necessary for the amount of each bill, check, or invoice, to be individually compared with and checked against the various account sheets onto which the items were posted. Obviously this procedure was, and still is, slow, tedious, and cumbersome.

One of the primary objects of the present invention is to provide simple and inexpensive, yet highly efficient means for accumulating, totaling and proving posted items against the total amounts of the various bills, invoices and checks from which the postings were made, and which will enable an operator to quickly locate the source of error in the event that the predetermined total and the tally total do not agree, thereby making it practical to return the record sheets to their files immediately after being posted.

In the event that the total of the items posted does not correspond with the predetermined total, the source of error may be quickly and easily discovered in the following manner: the amounts of the various bills, invoices, or checks as they appear upon the predetermined total sheet may be checked against the items entered on the tally sheet; or the bills, invoices, or checks from which the postings were made may be gone through in the same sequence in which they were posted and the amounts thereof may be checked against the entries made upon the tally sheet in the order of their posting. In the event that it is found that an item entered on the tally sheet does not agree with the corresponding amount of the bill, invoice, or check from which it was taken, it is but a simple matter to locate the particular record or account sheet upon which the incorrect entry was posted, by means of suitable identification provided on the bill or invoice.

With reference to Fig. 1, the numeral 10 represents a record sheet or account card onto which the amounts of the bills, invoices, checks, and the like, are posted. For convenience, record sheet 10 will be referred to as a customer's account card. Such card may be provided with suitable horizontal and vertical lines for subdividing it into suitable columns and subsections. Items of debit or credit may be posted on such a card from bills, invoices, checks, or the like in suitable columns such as 11 or 12.

The numeral 13 represents a tally sheet of the present invention which, it should be noted, is provided with a plurality of horizontal lines 14 which are preferably spaced apart by a dimension substantially equal to the vertical spacing of the horizontal lines 15 of account card 10. Tally sheet 13 is likewise subdivided into vertical dollar and cent columns 16 and 17 respectively, the respective widths of which preferably correspond to the vertical dollar and cent columns 18 and 19 of the customer's account card. If desired, a third vertical column 20 may be provided on tally sheet 13, to the right of the cent column 17 for checking purposes.

As disclosed in Fig. 1 entries were posted on the customer's account card for the dates of January 8, March 11, June 17, August 2; and the entry for November 24 is in the process of being posted. As clearly disclosed in Fig. 1, horizontal line 21 of tally sheet 13 has been aligned with horizontal line 22 of record card 10, upon which line the entry for November 24 is being posted. The item $49.50 has just been posted in the debit column 11 of account sheet 10. It should be understood that the item of $49.50 is entered directly on tally sheet 13 from a bill, invoice, check, or the like, not shown.

The under or bottom surface of tally sheet 13 is provided with suitable transfer material such as, by way of example, a lampblack coating of the general character used in commercial carbon papers. By reason of the transfer material disposed on the bottom surface of the tally sheet, it is obvious that the notation $49.50 will be transferred or duplicated directly onto the debit column of line 22 of the customer's account card 10. Therefore, it may be said that simultaneously with the making of an entry on the tally sheet the same item is posted on the account card disposed therebelow.

It should be understood that the next lower horizontal line 23 of tally sheet 13 will be aligned with that horizontal line of the next customer's account or record card to be posted, and so on until entries have been made in each of the horizontal sections for the entire length of the tally sheet, or until all the posting has been completed, whichever occurs first.

As each customer's account card has thus been posted it may be returned directly to the file from which it was removed.

When desired, the items entered on the tally sheet may be totaled, and if desired, such a total may be entered in space 24 provided at the lower end of the tally, as illustrated. The total thus obtained may be compared with the predetermined total of the amounts of the bills, invoices, and checks posted. If these totals are in agreement, the operator knows that the various items posted on the customers' account cards were posted correctly.

In order to facilitate posting, separate tally sheets are used for the debit and credit entries, that is, any one tally sheet will contain either debit or credit entries, but not both.

In those instances where a control account for accounts receivable is kept, the totals of the tally sheets afford quick, accurate means for arriving at or determining the amount of accounts receivable by simply noting the difference between the totals of the debit tallys and the credit tallys to obtain a number which when added to or subtracted from the last recorded balance of accounts receivable, depending upon whether the debits or the credits are the greater, gives the true balance of accounts receivable.

In the event that the tally sheet total appearing in space 24 does not check with the predetermined total of the bills, invoices and checks posted, the individual entries of the tally sheet may be checked one by one, in order, against the amounts listed on the various bills, invoices and checks posted. Column 20 may, if desired, be utilized as a check column in which suitable marks may be placed for facilitating checking the posting media against the entries made on the tally sheet. When the particular entry which was incorrectly posted is reached, it will be clearly apparent to the operator because it will be that entry which does not agree with the amount of the corresponding posting media from which it was taken. By consulting suitable identifying data on such posting media, such as a name, code number, or the like, the operator may be supplied with sufficient information to enable her to quickly and easily select the particular account card 10 on which the erroneous entry was made, for the purpose of correcting said error.

In order to preclude accidental or unintentional soilage of the account cards with the transfer material disposed on the bottom surface of the tally sheet under the weight of the hand of an operator, a shield denoted generally by the numeral 30 may be provided. As shown in Fig. 2 such a shield may comprise a single sheet of material such as metal, paper, Cellophane, or the like, suitably formed to provide a pair of opposed U-shaped ends or guideways 31, the lower legs of which are common to bottom 32. The upper legs 33 are adapted to overlappingly engage opposite edges of a tally sheet 13 placed therein. The tally sheet is adapted to be freely slid through the U-shaped ends 31 of shield 30 for facilitating movement or feeding of the tally sheet therethrough in a longitudinal direction. In the preferred embodiment of the invention at least one leg of shield 30 is flexible for permitting an operator to depress it to engage the top surface of the tally sheet disposed thereunder for pressing said sheet against the shield bottom. In this manner the tally sheet may be accurately aligned relative to the ruling of the account sheet 10 and then securely held in alignment by reason of being gripped within shield 30.

As disclosed in Fig. 1 just so much of tally sheet 13 is preferably withdrawn from shield 30 as to expose only a sufficient amount to permit an entry to be posted onto line 22 of sheet 10. It is apparent that the transfer material 34 disposed on the under or bottom surface of tally sheet 13 is in coplanar contact with upper surface of the bottom wall 32 of shield 30 whereby smudging of card 10 between line 22 and its bottom edge 100 is effectively and positively precluded.

It should be understood, that if desired, tally sheet 13 may be provided in roll form in lieu of in separate strips as illustrated.

With reference to Figs. 3 and 4, a modified type of tally sheet is illustrated. The upper horizontal edge of the upper surface or face 40 of the sheet is provided with a plurality of dollar and cent columns 41 and 42 respectively, each of which are adapted to be sequentially aligned with dollar and cent columns of the debit or credit section of a customer's account card. The under surface 43 of sheet 40 is preferably provided with a narrow strip of transfer material denoted generally by the numeral 44, the width of which is at least equal to the spacing between the upper edge 45 of the tally sheet and the horizontal line 46 which defines the lower edge of the various dollar and cent columns 41 and 42, as shown. It should be noted that the lower or bottom surface 47 of tally sheet 40 between the lower edge 48 of the narrow strip of transfer material 44 and the bottom edge 49 of said sheet is left blank, but not for the purpose of precluding the transfer of data written on portion 50 of the sheet, as in the case of express company receipts, inasmuch as there is no occasion for writing or otherwise inscribing data in space 50 of the present tally sheet.

If desired the lower edge of tally sheet 13 may be provided with suitable sub-sections or spaces denoted by the numerals 51, 52 and 53, into which spaces suitable descriptive data may be entered, such as, by way of example, the date of the tally sheet, and the nature of the entry, that is, whether they are debit or credit entries. As illustrated, a check mark has been placed in debit space 53, thereby indicating to the operator that all of the entries on tally sheet 13 are debits which have been posted onto the account cards of the various customers.

It is to be understood that various modifications and changes in the structural details of the device may be made, within the scope of the appended claims, without departing from the spirit of the invention.

What is claimed is:

1. In a device of the class described, the combination which comprises a tally sheet in strip form, said tally comprising opposed side edges, a top surface including rulings for dividing it into a plurality of sections, and a bottom surface provided with a transfer material, a shield including a pair of opposed U-shaped guideways the lower leg of each guideway being interconnected for providing a continuous bottom, said tally sheet adapted to be fed longitudinally through said shield with its opposed side edges engaged by the guideways and with its lower face in coplanar contact with the shield bottom.

2. In a device of the class described the combination which comprises a plurality of record sheets upon which postings may be entered from posting media, a tally sheet in strip form the bottom face of which is provided with a transfer material, said tally sheet adapted to be superimposed on but one of said record sheets at a time whereby items entered on the tally will be transferred upon a particular record sheet, and means engaging the unused portion of said tally for precluding accidental or unintentional smudging of the record sheet with said transfer material incident to the posting operation.

3. In a device of the class described, the combination which comprises a tally sheet in strip form, said tally comprising opposed side edges, a top surface including rulings for dividing it into a plurality of sections, and a bottom surface provided with a transfer material, a shield including a bottom and a pair of opposed U-shaped guideways which are adapted to loosely engage opposite edges of said tally sheet; said tally sheet adapted to be fed longitudinally through said shield, the bottom surface of said tally adapted to engage the shield bottom for precluding accidental or unintentional transfer of the transfer material of the tally sheet onto a record sheet, under the weight of the hand of an operator incident to a posting operation, and means on said shield for releasably securing said tally relative to said shield for precluding relative motion between said tally and shield.

4. In a device of the class described, the combination of a tally sheet in strip form having a top writing surface and a bottom surface provided with transfer material, a shield comprising a strip of material having its edges formed to provide lateral guideways which are adapted to loosely engage the edges of a tally sheet fed longitudinally through said shield, at least one of said lateral guideways adapted to be flexed whereby to engage the tally sheet for precluding movement of said tally sheet relative to and through said shield.

5. In a device of the class described, the combination of a plurality of record sheets, a tally sheet in strip form having a top writing surface and a bottom surface provided with transfer material, and a tally sheet shield, said tally sheet adapted to be superimposed upon one of said record sheets at a time whereby items written on the top surface of the tally will be transferred onto the particular record sheet upon which the tally is superimposed and whereby the various items written on said tally will be accumulated thereon, said tally sheet shield comprising a strip of material having its edges formed to provide a pair of opposed guideways, said tally sheet adapted to be fed longitudinally through said shield with its edges loosely engaged by said guideways and with its bottom surface in contact with that portion of the shield between said guideways for precluding accidental or unintentional transfer of the transfer material of the tally onto a record sheet, incident to a posting operation.

STANLEY B. FREIBERG.